Patented Jan. 25, 1944

2,340,063

UNITED STATES PATENT OFFICE 2,340,063

FEEDING OF POULTRY

Bernard V. Lamb, Hayward, Calif.

No Drawing. Application September 29, 1941,
Serial No. 412,835

6 Claims. (Cl. 99—4)

This invention relates to improvements in the feeding of poultry, particularly chickens and turkeys.

I have discovered that by supplying poultry with a small quantity of certain materials, the health of the poultry is improved, their rate of growth is increased, they gain weight rapidly and effectively and, in the case of hens during the laying season, the period of laying is extended, the quality of the eggs is improved and the quantity of eggs increased.

The materials to be employed are properly classified as wetting agents. They can be added to the drinking water or they can be incorporated in a suitable dry feed. The wetting agents can ordinarily be employed with any suitable feed and nothing critical in this respect is involved in their use.

The concentration of the wetting agent is relatively small, of the order of 0.1 of 1% and less. I have successfully used a solution containing 2½% by weight of the wetting agent, adding this solution to the drinking water in the proportion of one ounce to each gallon of drinking water. In a dry feed, 2½ pounds of the wetting agent is added to 100 pounds of the feed and thoroughly mixed. One pound of this mixture is then added to another 100 pounds of feed.

The action of the material on poultry has been very carefully observed under different conditions. It appears to keep the digestive organs open and clear so that maximum assimilation of the food eaten by the bird occurs. No laxative or purgative value in the material has ever been evident. The birds' appetites are improved and sickly, runty birds soon become rugged and strong.

The following typical results are cited to show some of the benefits in employing the material of this invention. A group of White Leghorn cockerels were supplied with drinking water containing the wetting agent material of this invention in about .02 of 1%. At the end of eight weeks the cockerels had increased from two ounces to two pounds, on the average, while a control group of cockerels weighed on the average of 1½ pounds. At the end of thirteen weeks the experimental cockerels weighed four pounds each, a weight ordinarily attained only at the end of six months. They were of good eating quality. White Leghorn pullets kept under the same conditions as the cockerels showed the same proportionate gain in weight although pullets do not grow as fast as cockerels. At the end of six months the pullets weighed 3½ pounds and produced eggs at a production rate of 60% as compared to 30% for the control group. The production rate of normal birds is usually only 30% to 40%. The pullets were good healthy birds and never, during their life, had they shown any sign of having any of the common poultry diseases.

New Hampshire Red cockerels supplied with drinking water containing the material of this invention weighed a pound at the end of four weeks while a control group weighed only one-half pound, the two groups being kept under otherwise identical conditions. Old hens undergoing moulting passed through this period with more ease, the period being short and their weight remaining more nearly normal. 3500 turkeys, eleven weeks old, weighed twice as much after being supplied with drinking water containing the material of this invention for two weeks as a like number in a control group during the same period.

The wetting agent materials which I have found useful are broadly classed as sulfonates. The materials employed are, of course, water soluble and preferably neutral in water solution, imparting only a slight change, if any, in acidity or alkalinity to the water. Also, the wetting agents should be stable and should not decompose due to the varying acid and alkaline conditions in the digestive tract of the poultry and should therefore be stable between pH 4.5 and pH 9.5. The sulfonates are to be distinguished from merely sulfated materials.

The materials which I have found to be useful are classified as sulfonates, either acids, salts or esters of true sulfonic acids. I have successfully used sodium alkyl aryl sulfonates but any other sulfonate can be employed. I have successfully used such various sulfonates as are marketed under the following trade-marks: Nacconal NR, Nacconal NRL, Nacconal NRSF, products of National Aniline and Chemical Co., Inc. I have also used Lanitol P. from Arkansas Co., Inc.; Daconal, from S. A. Day Manufacturing Co.; Cerfax from E. F. Houghton and Co.; Aerosal O. S. from American Cyanamid and Chemical Corp.; Quaker Pro.-So- Tex 75 from Quaker Chemical Products Corp. Suitable lists of wetting agents are found in Industrial Engineering Chemistry for January, 1939, pages 66 to 69, and for January, 1941, pages 16 to 22, and in Bulletin E-504, June, 1940, Department of Agriculture, Division of Insecticide Investigation.

I claim:

1. A poultry conditioner consisting of a feed material assimilatable by poultry and containing about .02% of a sulfonated hydrocarbon wetting agent which is stable in dilute water solution between pH 4.5 and pH 9.5.

2. A poultry conditioner consisting of a feed material assimilatable by poultry and containing about .02% of an alkyl aryl sulfonate wetting agent which is stable in dilute water solution between pH 4.5 and pH 9.5.

3. A poultry conditioner consisting of a feed material assimilatable by poultry and containing about .02% of sodium alkyl aryl sulfonate wetting agent which is stable in dilute water solution between pH 4.5 and pH 9.5.

4. A poultry feed material consisting of less than about 0.1% by weight of a sulfonated hydrocarbon wetting agent, the balance of the material being a poultry feed, said wetting agent being stable in dilute water solution between pH 4.5 and pH 9.5.

5. A poultry feed material consisting of less than about 0.1% by weight of an alkyl-aryl wetting agent, the balance of the material being a poultry feed, said wetting agent being stable in dilute water solution between pH 4.5 and pH 9.5.

6. A poultry feed material consisting of less than about 0.1% by weight of a sodium alkyl aryl sulfonated hydrocarbon wetting agent the balance of the material being a poultry feed, said wetting agent being stable in dilute water solution between pH 4.5 and pH 9.5.

BERNARD V. LAMB.